UNITED STATES PATENT OFFICE.

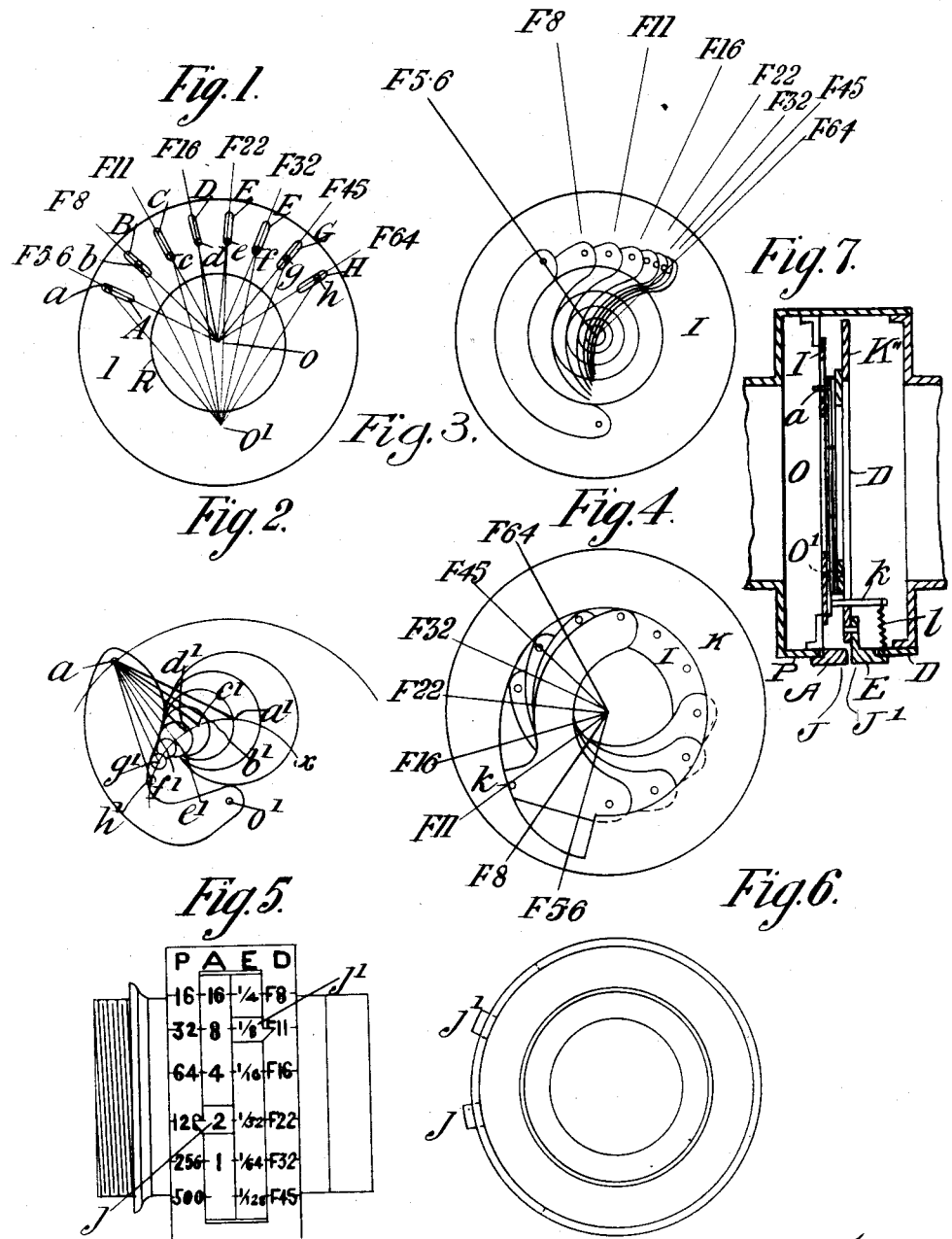

ALFRED WATKINS AND CHARLES G. WOODHEAD, OF HEREFORD, ENGLAND.

APPLIANCE FOR ADJUSTING AND WORKING IRIS DIAPHRAGMS OF PHOTOGRAPHIC CAMERAS.

No. 871,654.    Specification of Letters Patent.    Patented Nov. 19, 1907.

Application filed March 14, 1905. Serial No. 250,063.

*To all whom it may concern:*

Be it known that we, ALFRED WATKINS and CHARLES GODFREY WOODHEAD, both subjects of the King of Great Britain, residing at Imperial Mills, Hereford, in the county of Hereford, England, have jointly invented certain new and useful Improvements in Appliances for Adjusting and Working Iris Diaphragms of Photographic Cameras, of which the following is a specification.

In the specification of Watkins U. S. Patent No. 681,087 dated 20th August 1901 are described means of adjusting and working shutters and diaphragms of photographic cameras by means of a pair of slides adjustable relatively to each other, the one indicating or operating the diaphragm appliance and the other connected to the shutter timing mechanism.

The present invention relates to the application of such slides for a similar purpose but in conjunction with iris diaphragms and to a modified use of the said slides.

To effect the first object it is necessary that the area of the iris opening through which the light passes should vary in the same proportion for equal amounts of rotary movement given to the iris plate slide, and in connection with this, the iris plate slide may be furnished with a logarithmic scale which is to be used in connection with the scales referred to in the above specification. This may be accomplished in a number of ways, as for example, with the usual device for opening and closing the leaves of the diaphragm, the effective part of the edges of the leaves may be so shaped as to give the required result. Or the ordinary iris diaphragm may be used and a suitable movement link interposed between the iris plate slide and the diaphragm leaves to vary the speed of movement of the latter in such a manner as will produce the required result, the result aimed at being that equal movements of the iris plate will double or halve the area of the iris aperture.

In the accompanying drawings Figures 1 and 2 are diagrams illustrating one means of carrying the invention into effect by suitably shaping the diaphragm leaves; Figs. 3 and 4 illustrate a modified method in which the movement of ordinary diaphragm leaves is regulated to produce the same result; and Figs. 5 and 6 are views of a lens mount provided with the slides used in connection with this invention, and Fig. 7 is a diametrical sectional view of a lens mount such as shown in Fig. 5, showing the application of the method of regulating the iris opening which is illustrated in Figs. 3 and 4.

The first method is illustrated in Figs. 1 and 2 which show how the shape of the effective part of the leaves is arrived at.

In Fig. 1 the diaphragm leaves are pivoted at $O'$ and have pins such as $a$ movable in radial guide slots A in the iris plate I. Successive equiangular positions of one such guide slot are shown at A, B, C, D, E, F, G, H, corresponding to the varying areas of an iris diaphragm usually designated $F^{5.6}$, $F^8$, $F^{11}$, $F^{16}$, $F^{22}$, $F^{32}$, $F^{45}$, $F^{64}$ respectively, the corresponding positions of the pin of one diaphragm leaf being shown at $a, b, c, d, e, f, g, h$. O is the center of the aperture and O R the radius of the maximum aperture, corresponding to $F^{5.6}$.

Fig. 2 shows the geometrical construction by which the curve of the effective part of the iris leaf is obtained, that is to say that portion of the edge of the leaf which contributes to the formation of the iris opening to a greater or less extent according to the extent of the opening. In this figure $O'$ represents the pivot of the iris leaves, and $a$ represents the pin of one leaf, these two parts being in the same relative position as in Fig. 1. With $O'$ as a center and a distance as radius equal to the distance between $O'$ and O in Fig. 1, the circle X is drawn. Then with $a$ as center and with radii equal to the distances between O and $a, b, c, d, e, f, g$, and $h$, respectively, in Fig. 1, circles are drawn which intersect the circle X in the points $a'$, $b', c', d', e', f', g'$, and $h'$, respectively. With these points as centers a series of circles are drawn having radii equal to the distance O R in Fig. 1 multiplied respectively by $$1, \frac{5.6}{8}, \frac{5.6}{11}, \frac{5.6}{16}, \frac{5.6}{22}, \frac{5.6}{32}, \frac{5.6}{45}, \frac{5.6}{64}.$$

The curve tangential to these circles is then drawn as in Fig. 2, and this curve forms the effective part of the edge of the leaf, the remainder of which may be completed as shown.

An iris diaphragm having its leaves formed as above described will fulfil the condition that equal angular movements of the iris plate produce a constant rate of variation of the iris area, successive equal displacements of the iris plate doubling or halving the previous aperture area according to the direction of motion of the iris plate, because when the pin $a$ is moved by the radial guide slot into the various equiangular positions shown in Fig. 1, viz. $a, b, c, d, e, f, g, h$, the center of the aperture and the leaf are moved in relation to one another, the leaf occupying the successive positions indicated in Fig. 2 in each of which the effective part of the edge of the leaf is tangential to a circle of the size required. A number of such leaves, symmetrically disposed and symmetrically actuated, will thus form an aperture which varies according to the required law.

Figs. 3 and 4 illustrate one method of varying the movement of the curved leaves of an ordinary iris diaphragm, so as to fulfil the same condition. In Fig. 3 the angles between the radial lines show the successive angular displacements of the iris plate I (Figs. 3, 4 and 7) corresponding to the required rate of change of the area of the aperture. If now, there is added to the iris plate I an additional plate or ring K, having a part of its inner edge formed as a cam (as in Fig. 4) cut to the logarithmic scale of angular displacements shown in Fig. 3 that is to say the successive increments measured along the equally spaced radial lines $F^{5 \cdot 6}, F^8, F^{11}, F^{16}, F^{22}, F^{32}, F^{45}, F^{64}$, in Fig. 4, are proportional to the successive angular distances between the radial lines $F^{5 \cdot 6}, F^8, F^{11}, F^{16}, F^{22}, F^{32}, F^{45}, F^{64}$ in Fig. 3, so that for equal angular displacements in the iris plate I as indicated by the radial lines in Fig. 4 the corresponding displacements of the iris leaves about their pivots will be as indicated by the radial lines in Fig. 3, when a pin $k$ fixed to one of the iris leaves is constrained, as for example by means of a spring $l$ (Fig. 7) which tends to keep the iris open, to move along this cam when the iris plate is rotated, the movement of the iris leaves is thereby varied during equal angular displacements of the iris plate so as to make the area of the aperture vary at the required constant geometrical rate for successive equal angular displacements of the iris plate. With such an iris diaphragm it would be unnecessary to provide separate scales showing the diaphragm values corresponding to lenses of different foci or to the separate elements of a compound lens, such for example as might be used either as a doublet lens or with the front or back combinations by themselves. A single scale would suffice for all these lens systems, the values for each lens being indicated by a separate index or pointer.

An arrangement of lens mount illustrating the manner of utilizing the iris slide and scale for calculating exposures is shown in Figs. 5 & 6, which are respectively side and front elevations of such a mount. Four scales of values usually employed in such calculations, P, A, E, D, corresponding respectively to plate speed, actinic light value, exposure and diaphragm value, are arranged side by side, two of them, in this case scales A, E, being revoluble and provided with pointers J, J', which traverse the scales P, D, respectively. The revolving scale E is the iris plate slide controlling the iris aperture in the manner hereinbefore described, the scale A being simply a plain revoluble ring. The pointers J, J', having been set respectively to the scale values corresponding to the speed of the plate and the diaphragm to be used, and the actinic value of the light having been estimated or obtained by actinometer, the exposure is given by the value on scale E corresponding to the actinic value so formed as read on scale A. In Fig. 5 the apparatus is set for a plate speed of 128 and a diaphragm value $F^{11}$, and the correct exposure, for example, for actinic value 1 is 1/64th of a second. Obviously the order in which the scales are placed may be altered in many ways, as by interchanging scales A, E, or scales P, D, or otherwise.

The various scales are shown on the peripheries or edges of the slides or disks, but obviously they may be arranged on the faces of concentric rings or disks.

Having thus described the nature of this invention and the best means we know of carrying the same into practical effect, we claim:—

1. In combination with an iris diaphragm, a movable member connected therewith which is displaced by equal amounts when the area of the iris aperture is varied at a constant rate.

2. In combination with an iris diaphragm, a movable member connected therewith, and means connecting the diaphragm and movable member, whereby the area of the iris aperture is doubled or halved, according to the direction of movement, for equal displacements of the movable member.

3. The combination of an iris diaphragm, a rotating member actuating the iris leaves, and means connecting the actuating member with the iris leaves, whereby equal displacements of the said actuating member double or halve the iris area, according to the direction of rotation of the actuating member, substantially as described.

4. In an iris diaphragm, which is actuated by a movable member, an iris leaf having its effective edge shaped to alter the iris area by doubling or halving, according to the direction of motion of the actuating member, when the said actuating member is displaced by equal amounts.

5. The herein described improvement in diaphragm mechanism, comprising means for varying the area of the diaphragm opening, a rotatable operating element therefor, and means whereby equal angular movements of said operating element will effect equal division of multiplication of said area, for the purpose specified.

6. In combination with an iris diaphragm, a movable member connected therewith, and means for jointly operating the diaphragm and movable member, whereby the area of the iris aperture is doubled or halved, according to the direction of movement, for equal displacements of the movable member.

In testimony whereof we have signed our names to this specification in the presence of two subscribing witnesses.

ALFRED WATKINS.
CHAS. G. WOODHEAD.

Witnesses:
Z. T. PEAT,
JAMES PARKER.